United States Patent Office 2,903,363
Patented Sept. 8, 1959

2,903,363

SOLVENT FRACTIONATION OF WINTERIZED COTTONSEED OIL BOTTOMS

Gerald W. Farr, San Francisco, Calif.

No Drawing. Application September 17, 1954
Serial No. 456,881

1 Claim. (Cl. 99—118)

This invention relates to the preparation of specialized fats having certain improved properties, and to the application of such specialized fats for particular uses.

In many industries, it is desirous to have fats which are solid, or even brittle, at room temperature, but which melt at body temperature. Such fats are commonly used in candy making, in pharmaceuticals, and in the manufacture of various ointments and cosmetics. For this purpose, various vegetable butters, and particularly cocoa butter, have been used for years. Cocoa butter has the property of being hard at room temperature and melting at body temperature, so that various products can be prepared, such as chocolates, which are commercially acceptable, having a hard, glossy appearance, but which melt readily at body temperature. However, cocoa butter is expensive, and it is desirable to provide some less expensive fat which can be used in the above enumerated applications. Further, although cocoa butter has been used for this purpose for many years, it is not fully satisfactory since when it is used, candy made therefrom develops a quality called "bloom."

It is an object of the present invention to provide fats which are solid at room temperatures and which melt at body temperature, which can be prepared from easily available and relatively inexpensive fats.

Another object of this invention is to provide fats of generally improved properties over the fats found in nature, and even improve the quality of cocoa butter itself.

Still another object of the present invention is to prepare a useful product from the bottoms resulting from the winterizing of cottonseed oil.

Other objects will be apparent from a reading of the balance of the specification.

Most natural fats consist of mixtures of glycerides wherein the three hydroxyl radicals of the glycerol have been esterified with long chain fatty acids, which may be either saturated or unsaturated. Most natural fats contain the acyl radicals in varying proportions. Thus, cocoa butter has its desirable property because it consists largely of monounsaturated, disaturated triglycerides, and a relatively small proportion of trisaturated or triunsaturated glycerides, as well as a relatively small proportion of diunsaturated glycerides.

According to the present invention, the fat is fractionated in such a manner that the disaturated, monounsaturated triglycerides are separated from the rest of the mixture. In this manner, a fat resembling cocoa butter can be prepared from relatively inexpensive fats and cocoa butter itself can be given improved properties.

In general, the objects of the present invention are accomplished by fractionating common fats by means of fractional crystallization techniques. If the fat selected contains a considerable portion of trisaturated molecules, the fat is first crystallized from acetone or other suitable solvent at about room temperature or slightly below, to crystallize out the trisaturated fat, the fat is filtered and the filtrate is then chilled to a reduced temperature of about 30° F. and again filtered. The filtrate from the second filtration contains largely fat molecules having a single saturated acyl radical and two unsaturated acyl radicals, while the residue from the second filtration contains largely fat molecules having two saturated acyl radicals and one unsaturated acyl radical. It is the residue from the second filtration which constitutes the fat having the above enumerated desirable properties.

In accordance with the present invention, a fat of suitable physical properties is prepared which contains at least 75% of the disaturated, monounsaturated triglycerides.

Ordinarily, the first step in the preparation of my improved fats consists of removing saturated triglycerides, but in some cases it is unnecessary to perform this first step. For instance, as will be shown in later examples, cottonseed oil contains relatively few saturated triglycerides, so that the first crystallization step may be omitted. After the saturated triglycerides having been removed, if necessary, the balance of the material is chilled to about 30° F. and held for several hours, until precipitation ceases. The precipitate is then separated from the liquid portion, either by filtration or decantation, and it is found that this precipitate contains the desired fraction which is high in disaturated monounsaturated triglycerides. It is this fraction which has the highly desirable properties of remaining firm below about 30° C. and melting at temperatures from 30° to 42° C.

The following non-limiting examples illustrate various embodiments of the present invention:

*Example 1.*—About 3,000 cc. of acetone was added to 500 grams of vacuum bleached, melted palm oil. This mixture was held at a temperature of 60° F. for four hours, whereupon a precipitate formed. The mixture was then filtered through a coarse filter paper on a Büchner funnel with about 15″ of vacuum and the crystals were washed in an additional 500 cc. of acetone. The filtrate was cooled to 30° F. and held at this temperature for four hours, whereupon a second crop of crystals precipitated. The mixture was then filtered through a coarse filter paper, as before, with vacuum, and washed with another 500 cc. portion of acetone. The filtrate and the two precipitates were freed of solvent by distillation. The following fractions resulted:

|  | First precipitate | Second precipitate | Second Filtrate |
|---|---|---|---|
| Yield, g. | 51.0 | 129.0 | 315 |
| Iodine Value | 14.9 | 36.3 | 62.0 |
| Capillary melting point, ° F. |  | 98.0 |  |

The fat resulting from the second crystallization was firm below 85° F. and, as indicated above, was completely liquid at body temperature. This fat was then made up into a chocolate coating and compared with one made up entirely of ordinary cocoa butter.

In each case, the following proportions and procedures were used:

| | Grams |
|---|---|
| Fat | 15 |
| Cocoa | 12.5 |
| Sugar | 22.5 |

The cocoa contained 14% cocoa butter and the sugar was micropulverized with a small percentage of starch to prevent lumping. The mixture was heated to 140° F. with stirring, for several hours, until entirely fluid and free from lumps. The mixture was then cooled with stirring to 85° F. and held at this temperature until the mixture began to thicken. The temperature was then raised to 90° F. and the mixture poured into a metal mold that was divided into sections of approximately 2 x 3 x 1/8". As the molds were being poured, they were struck sharply on the bottom until air bubbles were eliminated. The molds were allowed to set for several hours at approximately 60° F. The solidified mixtures were removed from the molds by turning over and striking sharply. Mixtures made from both the fat prepared from palm oil and from cocoa butter dropped out of the molds readily, showing that the mixtures contracted adequately on cooling. The appearance of both samples was glossy and, when broken, there was a pronounced snap. It was difficult to see any physical difference between the two samples.

*Example 2.*—About 10 kilograms of refined cottonseed oil was cooled to 40° F. and held at this temperature for 48 hours. A precipitate formed and the clear oil was removed by decantation. To 500 grams of the melted residue which was left, there was added 3,000 cc. of acetone and the mixture was allowed to set at 70° F. for several hours. No precipitate formed, indicating that there was substantially no trisaturate present, and the mixture was then cooled to a temperature of 30° F. and held at this temperature for four hours. Crystals formed and were removed by filtration. The solvent was distilled from the residue crystals and also from the filtrate. A yield of 200 grams of crystals having an iodine value of 52.8 was obtained and a yield of 280 grams of the liquid fraction having an iodine value of 112 was obtained.

The disaturated portion, i.e., the crystals, was not firm enough for use as a cocoa butter substitute because it was viscous rather than solid at room temperature. The crystallized portion was then hydrogenated by placing 200 grams of the fat in a flask containing 2 grams of nickel catalyst and heated to 160° C. Hydrogen gas was added at atmospheric pressure and the flask agitated. In two hours, the iodine value was reduced from 52.8 to 33.61. The mixture was then filtered with vacuum through a Büchner funnel containing diatomaceous earth to remove the nickel catalyst. To 200 grams of filtrate, there was added 2,000 cc. of acetone, and the mixture was left standing at room temperature for several hours. A precipitate formed and the mixture was then filtered and the solvent removed by distillation from both the precipitate and the filtrate. There was obtained a yield of 60% precipitate having an iodine value of 30.3 and 40% of filtrate having an iodine value of 36.2. The solvent free fat from the filtrate was firm at room temperature and remained firm until 85° F. This residue is well suited for use as a substitute for cocoa butter. The precipitate was made up substantially of the glyceride of isoleic acid and had a melting point which was too high to be satisfactory for chocolate coatings, but was satisfactory for use as a shortening.

*Example 3.*—About 450 grams of melted lard was added to 3,000 cc. of acetone and the mixture held at a temperature of 60° F. for two and one-half hours. A precipitate formed and the mixture was passed through a filter. The filtrate was cooled to 25° F. and held at this temperature for four hours. A second precipitate formed and the mixture was passed through a filter to recover the precipitate. Upon being freed of solvent, the second precipitate had an iodine value of 36.3 and was suitable for use in the manufacture of chocolate coatings.

*Example 4.*—One kilogram of tallow was bleached by agitating it with 20 grams of acid filter earth at a temperature of 160° C. for thirty minutes. The hot mixture was filtered through a Büchner funnel to remove the filter earth. To 500 grams of the thus bleached tallow there was added 1500 cc. of acetone and the mixture was held at room temperature for four hours. The mixture was filtered and washed with fresh acetone and the precipitate that resulted was freed of solvent. The filtrate was chilled to 30° F. for four hours, whereupon a precipitate formed and the mixture was filtered. The precipitate from the second crystallization had a melting point of 38° C. and was firm at all temperatures up to 90° F., and was therefore suitable for use as a chocolate coating. The precipitate had an iodine value of 38.

*Example 5.*—A mixture containing 250 grams of liquid cocoa butter and 1500 cc. of acetone was held at a temperature of 65° F. for two hours. The mixture was filtered to remove the crystals and the filtrate was chilled to 30° F. The filtrate was held at this temperature for two hours, whereupon additional crystals formed which were removed by filtration. The solvent was removed from the second crop of crystals by distillation, resulting in a fat having an iodine value of 33, and a melting point of 93° F. The fat was a solid at room temperature. The fat from the second crystallization, and a sample of the untreated cocoa butter, were made up into chocolate coatings by the method described in Example 1. Both samples of chocolate coating were placed in a constant temperature oven and held at a temperature of 90° F. for twelve hours. The samples were then allowed to cool to room temperature and were examined for chocolate "blooming." The sample made from the fat which had been extracted was found to be substantially free of bloom, while the control made from cocoa butter was covered with bloom. The sample made from the extracted fat had more "snap," and would be judged to have a higher quality than the coating made from ordinary cocoa butter.

Although acetone was used in the above specific examples, other work has shown that any fat solvent can be used such as methyl ethyl ketone, methyl isobutyl ketone, isopropyl acetate, ethyl ether, hexane (petroleum ether), propane, and the like.

I claim:

A process utilizing winterized cottonseed oil bottoms as the sole fat source for the preparation of a hard butter which remains firm at a temperature below about 30° C. and melts at a temperature between about 30° and 42° C. comprising: adding a fat solvent to winterized cottonseed oil bottoms; chilling the solution so formed to a temperature of about 30° F. and allowing the solution to stand at this temperature to form a precipitate which is a crystalline material containing at least about 75% mono-unsaturated, di-saturated triglycerides; separating said precipitate from the supernatant liquid remaining, said liquid containing predominantly fats of greater degrees of unsaturation than the mono-unsaturated, di-saturated triglycerides; freeing the precipitate containing predominantly mono-unsaturated, di-saturated triglycerides of solvent; hydrogenating said precipitate at atmospheric pressure at a temperature of about 160° C. for about 2 hours; adding to the hydrogenated materials so formed a fat solvent; allowing the solution so formed to stand at room temperature for a time sufficient to form a precipitate while leaving in solution a material having an iodine value of about 36; separating the precipitate from said solution; and recovering the material having an iodine value of about 36 from said solution as the desired product.

References Cited in the file of this patent

UNITED STATES PATENTS

| | | |
|---|---|---|
| 2,024,356 | Harris | Dec. 17, 1935 |
| 2,313,636 | Freeman | Mar. 9, 1943 |
| 2,352,883 | Bolley | July 4, 1944 |
| 2,442,538 | Abbott | June 1, 1948 |
| 2,450,235 | Gee | Sept. 28, 1948 |
| 2,487,931 | Lataner | Nov. 15, 1949 |
| 2,610,915 | Matill | Sept. 16, 1952 |
| 2,619,421 | Greenfield | Nov. 25, 1952 |

FOREIGN PATENTS

| | | |
|---|---|---|
| 582,557 | Great Britain | Nov. 20, 1946 |
| 590,916 | Great Britain | July 31, 1947 |

OTHER REFERENCES

Bailey: "Melting and Solidification of Fats," published by Interscience (N.Y.), 1950, pages 315 to 317 relied on.